May 19, 1953  W. W. FARRAR  2,639,105
TRAVERSING MECHANISM
Filed May 24, 1949  3 Sheets-Sheet 1

INVENTOR.
Willie W. Farrar
BY
Wayland D. Keith
HIS AGENT.

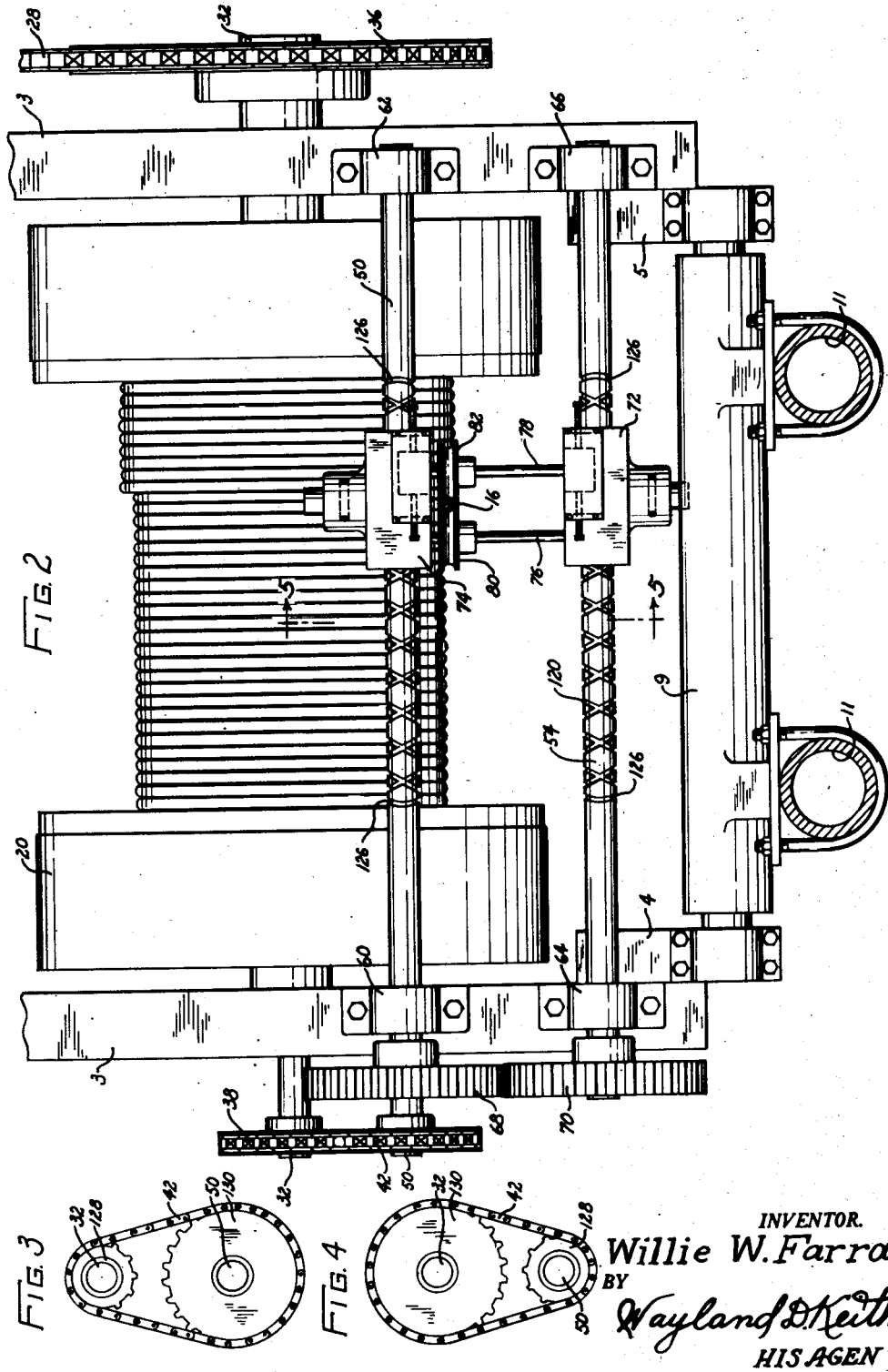

May 19, 1953 W. W. FARRAR 2,639,105
TRAVERSING MECHANISM
Filed May 24, 1949 3 Sheets-Sheet 3
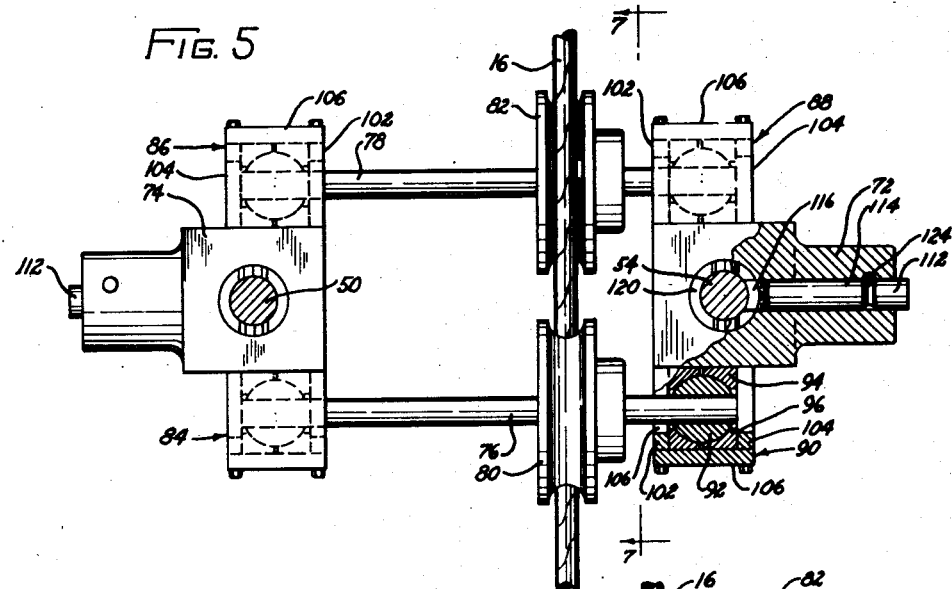
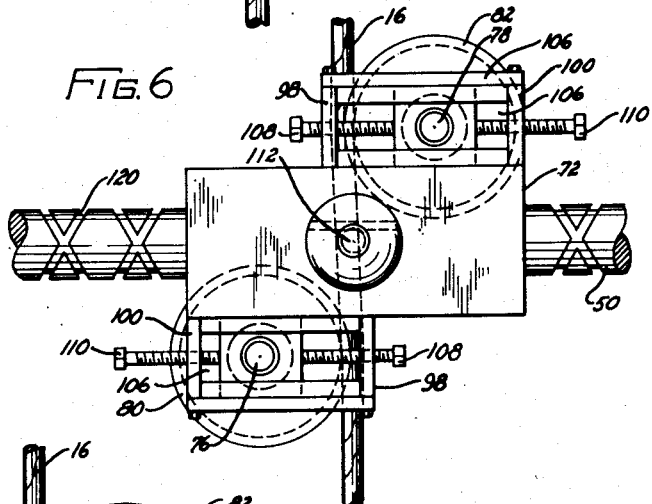
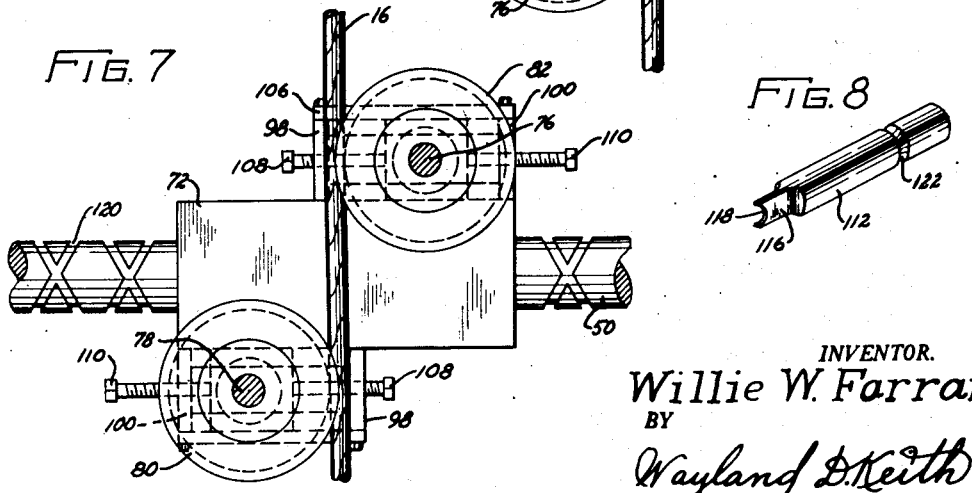
INVENTOR.
Willie W. Farrar
BY
Wayland D. Keith
HIS AGENT.

Patented May 19, 1953

2,639,105

UNITED STATES PATENT OFFICE 2,639,105

TRAVERSING MECHANISM

Willie W. Farrar, Wichita Falls, Tex.

Application May 24, 1949, Serial No. 95,042

6 Claims. (Cl. 242—158)

This invention relates to a level winding device for cable spooling, and more particularly to apparatus of the character described having means for rendering the same easily adjustable for use in the spooling of cable of various different diameters.

An important object of the invention is to provide traversing mechanism applied to cable spooling apparatus, whereby the cable is maintained in tangential alignment with the surface upon which the cable is being wound, at all times during winding operation.

A further object of the invention is the provision of level winding mechanism readily adaptable for use with a wide range of cables of different diameters, which mechanism is effective to assure the guiding of the cable onto the drum in closely wound helical layers in a level condition.

A still further object is the provision of level winding mechanism for cable spooling, of simple design and rugged construction, capable of giving long service and withstanding the rough usuage to which such a device is likely to be subjected.

To the accomplishment of the above and other objects the invention comprises, briefly stated, level winding mechanism having two simultaneously operated double threaded screws supporting a carrier mechanism for traversing movement with relation to a winding drum, and appropriate driving means associated with the winding drum and screws for coordinating the operation of the traversing mechanism with the winding drum to secure the level winding of the cable on the drum.

The invention will best be understood from the following detailed description of the same, taken in conjunction with the annexed drawings, wherein Fig. 1 is a side elevational view of one type of cable reeling mechanism, with which the invention is adapted to be employed, showing two such traversing mechanisms mounted in association with two separate winding drums;

Fig. 2 is a plan view partly in section, taken along the line 2—2 of Fig. 1, showing the structural details of one of the level winding devices and the associated winding drum and driving mechanism therefor;

Fig. 3 is a side elevational view of a portion of the driving mechanism for the level winding device showing the manner in which the same is adapted for use with cable of relatively small diameter;

Fig. 4 is a similar side elevational view of a portion of the driving mechanism, indicating the arrangement of the parts whereby the level winding device is adapted for the use with cable of relatively large diameter;

Fig. 5 is a side elevational view of the cable guide mechanism, on a somewhat enlarged scale, showing the details of construction of the same;

Fig. 6 is an end elevational view of the cable guide mechanism, showing the relative positions of the guide sheaves with relation to the cable and the traversing screws;

Fig. 7 is a sectional view taken along the line 7—7 of Fig. 5, looking in the direction indicated by the arrow; and Fig. 8 is a detailed view of one of the pins by which cable guiding mechanism is operatively connected to the traversing screws.

Figure 1:
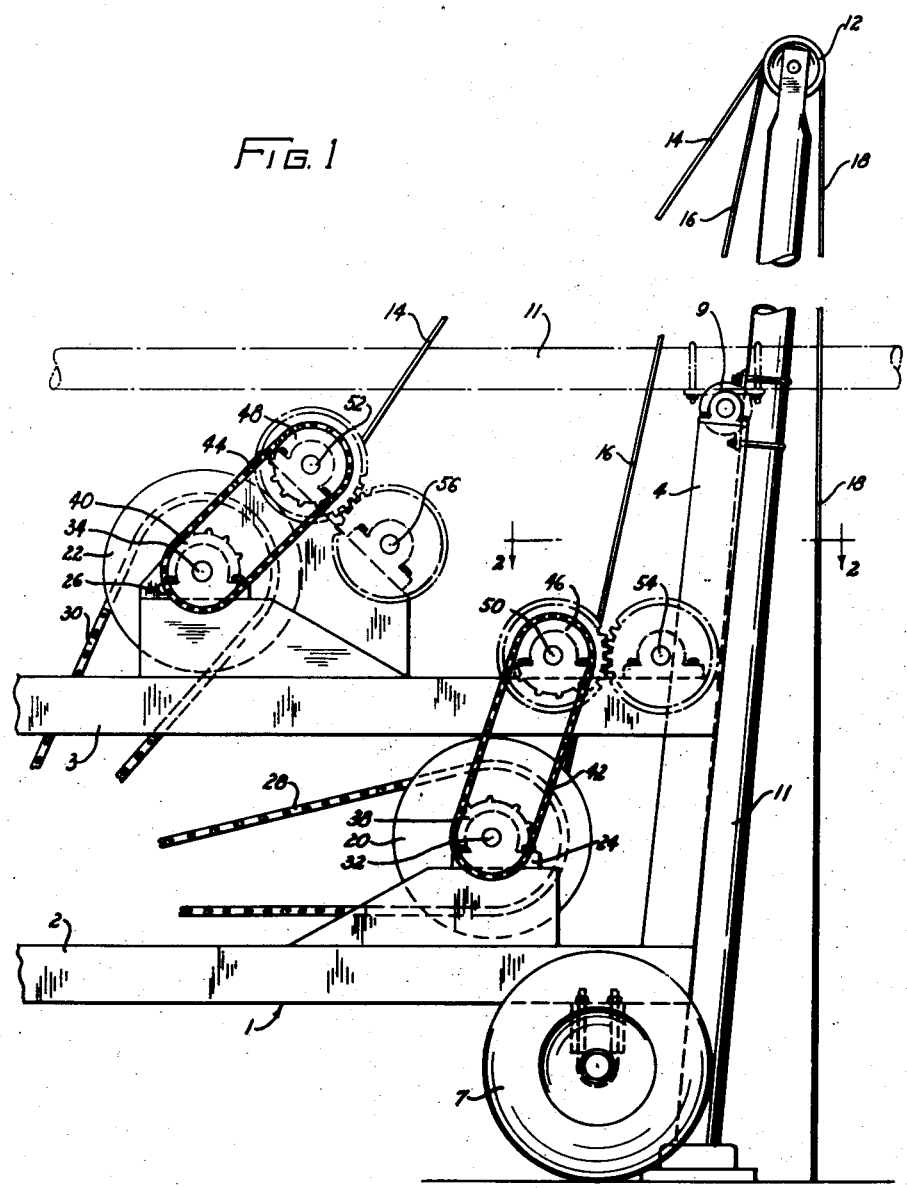

The invention will be described in this application to a particular type of cable winding mechanism, but it is to be understood that the same is not confined to such use, but is capable of being employed with a wide variety of different types of winding mechanisms, and in fact may be used with any kind of cable winding apparatus in which it is desired to maintain proper tangential relationship between the cable and the surface on which the same is to be wound, and to secure the spooling of the cable in even layers.

Referring to the drawings in greater detail the numeral 1 indicates generally cable winding mechanism, which, for the sake of example, may take the form of a spudder, such as is commonly used in the drilling of oil wells. Such winding apparatus may have horizontally disposed frame members 2 and 3, vertical frame members 4 and 5, and may be supported on suitable wheels, such as indicated at 7, for convenience in transporting the spudder to the place where the same is to be operated.

The spudder may be provided with the customary pivot shaft 9, journaled to the supporting structure described, for pivotally securing thereto the mast 11 of the drilling machine. The mast 11 may be furnished, at its upper end, with a number of sheaves 12 to accommodate cables, such as 14, 16, and 18 employed in the various operations for which the spudder is used.

In the illustration given in Fig. 1, two winding drums 20 and 22 are mounted on the spudder, in suitable bearing structures, indicated by 24 and 26 and supported respectively on the frame members 2 and 3. These winding drums are rotated from a source of power, as shown, through intermediation of the driving chains 28 and 30, operatively connected to sprockets attached to supporting shafts 32 and 34 of said drums, one of which sprockets is indicated by 36, in Fig. 2.

Each of the winding drums 20 and 22 has associated therewith, one of the level winding devices of the invention, as clearly seen in Fig. 1. The winding devices are adapted to operate by rotation of the respective drums through the intermediation of sprockets 38 and 40 attached to the shafts 32 and 34 respectively, which sprockets operate the driving chains 42 and 44 respectively. Drive chains 42 and 44 in turn pass over sprockets 46 and 48 respectively, which are each attached to one of the traversing screws 50 and 52 respectively of the level winding devices associated with the winding drums.

Each of the level winding devices has a second traversing screw, indicated at 54 and 56 respectively in Fig. 1, which second traversing screws are adapted to be driven from the first traversing screws 50 and 52 respectively, by means of gears or other suitable driving means.

The traversing screws 50, 52, 54 and 56 are all supported in suitable bearings, such as the bearings 60, 62, 64 and 66, associated with the traversing screws 50 and 54, and attached to the frame member 3 by bolts or other means, as indicated in Fig. 2. The traversing screws of each of the level winding devices rotate at the same speed through the provision of a gear, such as that indicated at 68 in Fig. 2, located on the screw 50, which meshes with a similar gear 70 positioned on the screw 54.

Each of the traversing mechanisms includes cable guiding structure, the details of which are best seen in Figs. 5 to 8 inclusive, and which is shown in application on the level winding device in Fig. 2.

The cable guide structure comprises block members 72 and 74 having openings therethrough for the reception of the traversing screws 54 and 50 respectively, said block members being connected together by parallel shafts 76 and 78, which shafts support guide sheaves 80 and 82, between which the cable 16 passes.

The shafts 76 and 78 are supported by universal bearings 84, 86, 88 and 90, secured to the block members 72 and 74. Each of the universal bearings comprises a ball member 92, positioned on an end of one of the shafts 76 and 78, which ball is received between opposed concave members 94 and 96, carried in a supporting frame on the block member.

There are four such supporting frames, two for each of the shafts 76 and 78, and each of the frames comprises end plates 98 and 100, side plates 102 and 104, all securely attached to a block member, and a cover plate 106, bolted or otherwise secured to the outer edges of the side and end plates.

Openings 108 may be provided in the side plates 102, of a size to permit the shafts 76 and 78 to have free angular movement with respect to the block members 72 and 74, and also to permit the universal bearings to be moved back and forth longitudinally of the supporting frame, in order to adjust the positions of the guide sheaves 80 and 82, with respect to the cable 16. Each of the universal bearings is adjusted in position in the supporting frame by screws 108 and 110, passing through the end plates 98 and 100 respectively, whereby the position of any universal bearing can be adjusted lengthwise of the supporting frame and securely held in such position.

Each of the traversing screws is formed with helical threads involving right and left hand leads constituting a continuous thread extending from one end to the other of the threaded portion of the screw, and back again. A pin 112, shown in detail in Fig. 8 is received in a hole 114 in each of the block members of the traversing mechanism, which pin is formed with a flattened portion 116 at its inner end having an arcuate cut out 118 at its extremity. The pin 112 has the end 116 extending into the thread 120 of the traversing screw 54, as seen in Fig. 5, the arcuate cut out 118 conforming in shape to the curvature of the screw at the bottom of the thread. A groove 122 is formed near the outer end of the pin 112, which groove receives a ring 124, for the purpose of retaining the pin in position in the block member in engagement with the thread 120 of the traversing screw.

By means of the arrangement just described, the block members 72 and 74 are caused to move back and forth on the traversing screws, as the same are rotated. When the block members reach the ends of the threaded portions of the screws, the pin 112 in each member is slightly rotated by reason of the curved portion 126 of the thread 120, and continued rotation of the screws causes the block members to move back along the screws toward the opposite ends of the same. Thus the traversing mechanism moves continuously back and forth parallel with the axis of the winding drum, guiding the cable as the same is wound on the drum.

In the event it is desired to use the level wind device with a cable of smaller diameter, for example, a one quarter inch cable, then the driving mechanism for the traversing screws must be arranged as seen in Fig. 3, wherein small sprocket 128 may replace the sprocket 38 on the shaft 32 of drum 20, and a larger sprocket 130 is substituted for the sprocket 46 on the traversing screw 50. Thus a single rotation of the drum 20 will result in rotating the traversing screws 50 and 54 only one half of a revolution, and the cable will be advanced along the drum only one quarter inch, which is the proper amount when winding a quarter inch cable on the drum.

On the other hand, should it be desired to use the level winding device with a somewhat larger cable, such as a one inch cable, then the driving mechanism for the traversing screw must be changed to correspond to the arrangement shown in Fig. 4, in which the parts are in the reverse order of Fig. 3. The sprocket 130 in this case is placed on the shaft 32 of drum 20 while the sprocket 128 is positioned on the traversing screw 50. Thus a single rotation of the drum 20 results in two rotations of the traversing screws 50 and 54, advancing the traversing mechanism one inch along the drum, to wind a coil of the one inch cable on the drum in close proximity to the previously wound turn thereon.

By reason of the adjustability of the universal bearings of the shafts 76 and 78 on the block members 72 and 74, the guide sheaves 80 and 82 can be moved into engagement with the cable 16, regardless of the size of the same, and in the condition of the mechanism as seen in Fig. 6 the sheaves bear against the cable in opposite directions, to eliminate any possibility of whipping motion of the cable as the same is wound onto or off of the drum. Moreover, in the event that the shaft of the drum, and the traversing screws are not perfectly in alignment, adjustments of the positions of the sheaves 80 and 82 may be made to compensate for any misalignment, thus assuring that the cable will still be uniformly wound on the drum. It will also be apparent that due to the universal bearings on the shafts 76 and 78 the block members 72 and 74 can occupy positions out of alignment with each other, without causing the traversing mechanism to become jammed, and at the same time the shafts 76 and 78 will always remain parallel. Thus, if for any reason there should be a tendency for one of the block members to lead the other, the traversing mechanism will continue to function properly.

The guide sheaves 80 and 82 are free to rotate on the shafts 76 and 78 respectively, and slide longitudinally of these shafts, so that as additional layers of cable are wound onto or off of the drum, the sheaves can move along the shafts accordingly to properly guide the cable.

It will thus be seen that the invention, as above described, provides a level winding device for cable spooling, which is of simple design and rugged construction, and capable of ready adjustment for varying conditions of use.

Having thus clearly shown and described the invention, what is claimed as new and desired to secure by Letters Patent is:

1. A level winding device for a cable receiving drum comprising a pair of parallel screw shafts spaced apart and mounted a spaced distance from the axis of said drum, a carriage supported on each of the screw shafts for traversing movement longitudinally of said drum, a pair of parallel transverse shafts supported between said carriages in universal bearings so as to permit angular movement of said parallel transverse shafts with respect to said parallel screw shafts, cable guiding means positioned on said parallel transverse shafts in position to engage opposite sides of a cable being spooled onto said drum, said cable engaging means being adapted to move along said parallel transverse shafts transversely of said drum while said carriages are moving longitudinally of said parallel screw shafts, gear means for driving said parallel screw shafts in a unity ratio and gear means for driving said parallel screw shafts at a predetermined ratio to said drum.

2. A level winding device for a cable receiving drum comprising a pair of parallel screw shafts spaced apart and mounted a spaced distance from the axis of said drum, a carriage supported on each of the screw shafts for traversing movement longitudinally of said drum, a pair of parallel transverse shafts supported between said carriages in universal bearings so as to permit angular movement of said parallel transverse shafts with respect to said parallel screw shafts to enable one of said carriages to lead the other, cable guiding means positioned on said parallel transverse shafts in position to engage opposite sides of a cable being spooled onto said drum, said cable engaging means being adapted to move along said parallel transverse shafts transversely of said drum while said carriages are moving longitudinally of said parallel screw shafts, gear means for driving said parallel screw shafts in a unity ratio and chain and sprocket means for driving said parallel screw shafts at a predetermined ratio to said drum.

3. A level winding device for a cable receiving drum comprising a pair of parallel screw shafts spaced apart and mounted a spaced distance from the axis of said drum, a carriage supported on each of the screw shafts for traversing movement longitudinally of said drum, a pair of parallel transverse shafts supported between said carriages in spherical bearings so as to permit angular movement of said parallel transverse shafts with respect to said parallel screw shafts, cable guiding means positioned on said parallel transverse shafts in position to engage opposite sides of a cable being spooled onto said drum, said cable engaging means being adapted to move along said parallel transverse shafts transversely of said drum while said carriages are moving longitudinally of said parallel screw shafts, gear means for driving said parallel screw shafts in a unity ratio and gear means for driving said parallel screw shafts at a predetermined ratio to said drum.

4. A level winding device for a cable receiving drum comprising a pair of parallel shafts spaced apart and mounted a spaced distance from the axis of said drum, each of said parallel shafts having right and left screw threaded grooves formed therein which threads are so interconnected near the end of each of said shafts as to present a continuous groove, a carriage supported on each of the screw shafts for traversing movement longitudinally of said drum, a pair of parallel transverse shafts supported between said carriages in spherical bearings so as to permit angular movement of said parallel transverse shafts with respect to said parallel screw shafts to enable one of said carriage members to lead the other, said spherical bearings mounting each end of each of said parallel shafts, said bearings being slidably mounted for adjustment longitudinally with respect to said screw shafts, screw means for moving each of said spherical bearings longitudinally of the axis of said screw shafts, cable guiding means positioned on said parallel transverse shafts in position to engage opposite sides of a cable being spooled onto said drum, said cable engaging means being adapted to move along said parallel transverse shafts transversely of said drum while said carriages are moving longitudinally of said parallel screw shafts, gear means for driving said parallel screw shafts in a unity ratio and gear means for driving said parallel screw shafts at a predetermined ratio to said drum.

5. A level winding device for a cable receiving drum comprising a pair of parallel screw shafts spaced apart and mounted a spaced distance from the axis of said drum, a carriage supported on each of the screw shafts for traversing movement longitudinally of said drum, a pair of parallel transverse shafts supported between said carriages in universal bearings so as to permit angular movement of said parallel transverse shafts with respect to said parallel screw shafts, a cable guiding sheave positioned on each of said parallel transverse shafts in position to engage opposite sides of a cable being spooled onto said drum, said cable guiding means being adapted to move along said parallel transverse shafts transversely of said drum while said carriages are moving longitudinally of said parallel screw shafts, gear means for driving said parallel screw shafts at a predetermined ratio to the drum so that said sheaves will be moved longitudinally of the drum a distance equal to the diameter of the cable upon each revolution of said drum.

6. A level winding device for a cable receiving drum comprising a pair of parallel screw shafts spaced apart and mounted a spaced distance from the axis of said drum, a carriage supported on each of the screw shafts for traversing movement longitudinally of said drum, a pair of parallel transverse shafts supported between said carriages in universal bearings so as to permit angular movement of said parallel transverse shafts with respect to said parallel screw shafts, cable guiding means positioned on said parallel transverse shafts in position to engage opposite sides of a cable being spooled onto said drum, said cable engaging means being adapted to move along said parallel transverse shafts transversely of said drum while said carriages are moving longitudinally of said parallel screw shafts, means on said carriages for adjusting the angularity of said transverse shafts with respect to said longitudinal screw shafts, gear means for driving said parallel screw shafts in a unity gear ratio and gear means for driving said parallel screw shafts at a predetermined ratio to said drum.

WILLIE W. FARRAR.

References Cited in the file of this patent

UNITED STATES PATENTS

| Number | Name | Date |
| --- | --- | --- |
| 1,570,116 | Yount | Jan. 19, 1926 |
| 1,646,804 | Westwood | Oct. 25, 1927 |
| 1,797,331 | Dale | Mar. 24, 1931 |
| 2,324,329 | Shoffner | July 13, 1943 |
| 2,421,269 | Joyce | May 27, 1947 |
| 2,458,065 | Farrar | Jan. 4, 1949 |